Oct. 15, 1968   R. J. KUGLER   3,405,863
PLASTIC BAG FOR ROUND-SHAPED OBJECT
Filed Sept. 6, 1967   2 Sheets-Sheet 2

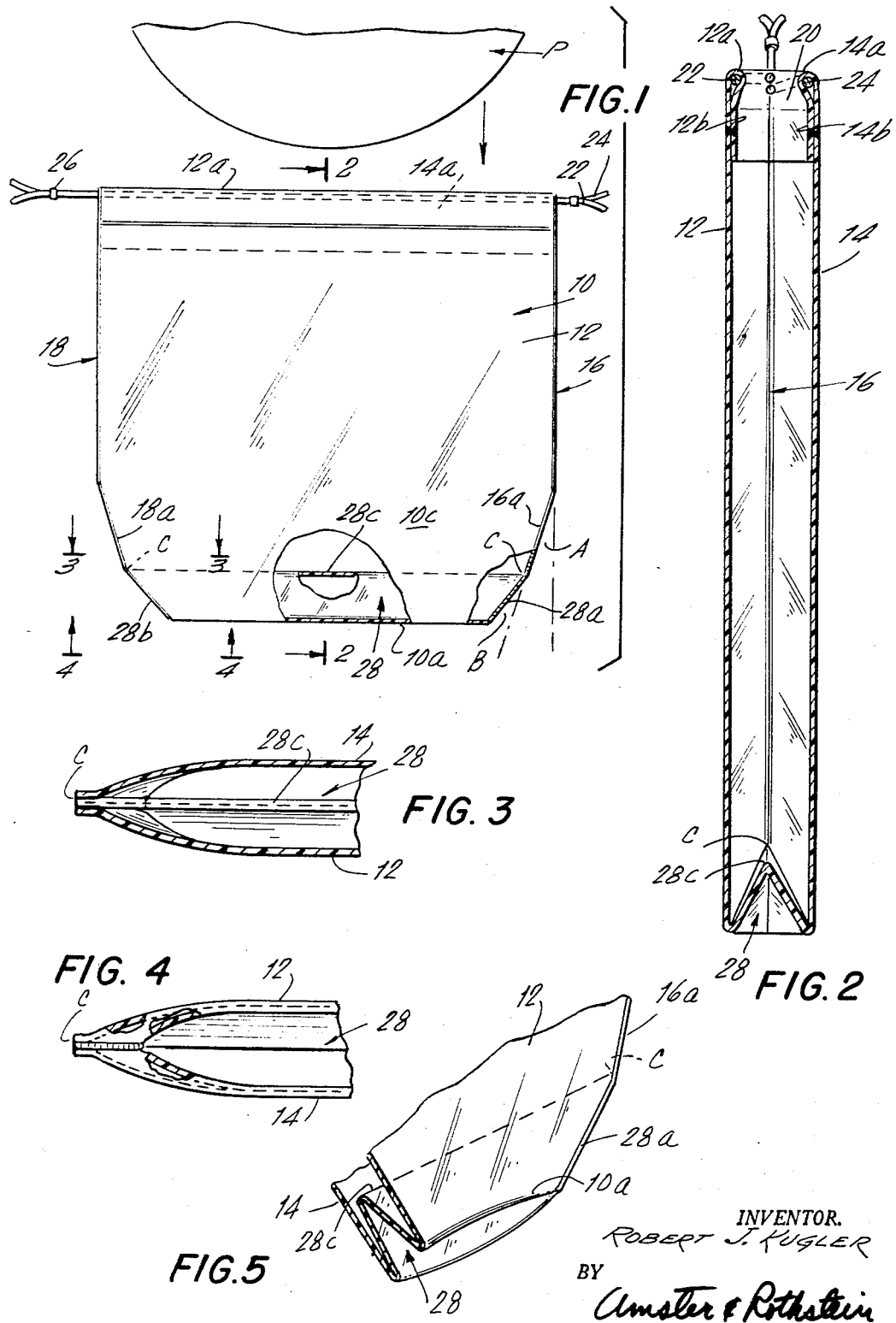

INVENTOR.
ROBERT J. KUGLER
BY
Amster & Rothstein
ATTORNEYS

United States Patent Office 3,405,863
Patented Oct. 15, 1968

3,405,863
PLASTIC BAG FOR ROUND-SHAPED OBJECT
Robert J. Kugler, East Meadow, N.Y., assignor to Action Packaging Corporation, Brooklyn, N.Y., a corporation of New York
Filed Sept. 6, 1967, Ser. No. 665,818
2 Claims. (Cl. 229—57)

ABSTRACT OF THE DISCLOSURE

A plastic bag having a bottom construction which neatly fits about the curved edge of a round-shaped object, such as a plate, this bottom construction being formed with an economically produced gusset having, in the flat, a horizontally oriented bottom edge, but unfolding into a shape having a curved bottom edge. This unfolded curved edge cooperates with inwardly tapered adjacent length segments in the sides of the bag to provide the bag with a desired appropriately curved bottom edge that conforms in shape to the adjacent curved edge of the plate without unsightly "dog ears."

---

The present invention relates to plastic bags and, more specifically, to an improved economically mass produced bag which is particularly suitable as a package for round-shaped objects.

As generally understood, unless a plastic bag is specially appropriately shaped and provided with a curved bottom edge, there is apt to be unsightly "dog ears" at the opposite corners of the bag when it is used for round-shaped objects. Thus, bags for plates and like objects are usually made with a curved bottom line or edge heat sealed across the bag, even though the application of the heat seal increases the handling and the processing time of the plastic in the bag-making apparatus.

Broadly, it is an object of the present invention to provide an improved plastic bag, particularly suitable for round-shaped objects, and capable of being economically mass produced. Specifically, it is an object to provide a plastic bag having a horizontally oriented bottom edge in the flat, but when serving as a container for a typical round-shaped object, such as a plate, having an appropriately curved bottom edge which conforms in shape to the shape of the plate without unsightly "dog ears" developing in the opposite corners of the bag.

An important contribution of the present invention is the appreciation that the unfolding of a bottom gusset construction entails the projection of the gusset fold line beyond the bottom edge of the bag in the flat, and that this projection occurs to a greater extent in the middle of the gusset than in the side areas adjacent the side welds of the bag. Thus, the projected gusset fold line, after unfolding of the gusset, assumes a naturally curved configuration or shape which, in accordance with the present invention, is combined with bag structure cooperating therewith to provide an inwardly tapered bottom bag construction which neatly fits about a round-shaped object disposed within the bag. Thus, the same desirable end result provided by a specially shaped bag is provided by the bag hereof, but without the attendant expense of the specially shaped bag.

A plastic bag demonstrating objects and advantages of the present invention includes a pair of front and rear walls heat sealed to each other along opposite marginal edges to form a bag enclosure and having a tapered construction in the bottom end of the enclosure. Specifically, this construction is a bag section of progressively reduced width which terminates in a bottom gusset, which is of a still further progressively reduced width; the gusset, when unfolded as already noted, providing the bag with a curved bottom edge which is continued part way up along the sides of the bag by the inwardly tapered sides of the adjacent bag section.

The above brief description, as well as further objects, features and advantages of the present invention, will be more fully appreciated by reference to the following detailed description of a presently preferred, but nonetheless illustrative, embodiment in accordance with the present invention, when taken in conjunction with the accompanying drawings, wherein:

FIG. 1 is a front elevational view of the plastic bag hereof, with portions broken away to better illustrate internal structural features, and including a partial showing of an exemplary round-shaped object to be packaged in the bag;

FIG. 2 is a side elevational view, on an enlarged scale and in section taken on line 2—2 of FIG. 1, illustrating further structural details of the bag;

FIG. 3 is a partial plan view, in section taken on line 3—3 of FIG. 1, illustrating structural deails of the bottom gusset;

FIG. 4 is a view similar to FIG. 3, but showing the bottom gusset as seen from below along line 4—4 of FIG. 3;

FIG. 5 is a partial perspective view of a corner of the bottom gusset construction;

Figures 6, 7:
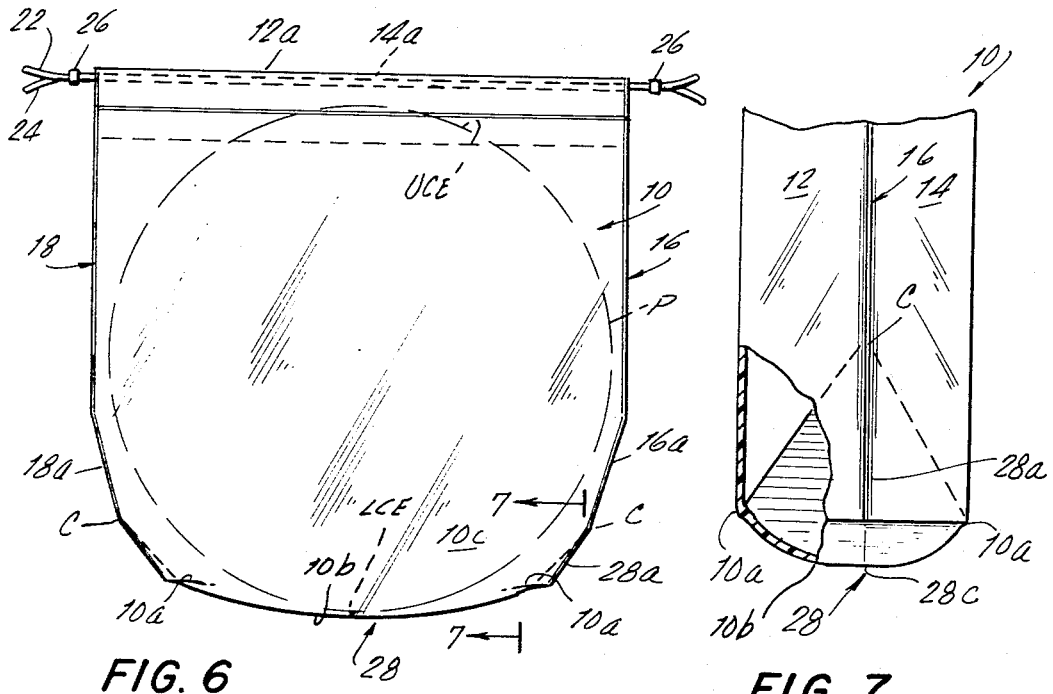
FIG. 6 is a front elevational view similar to FIG. 1 but illustrating a round-shaped object fully disposed within the bag.
FIG. 7 is a partial elevational view, on an enlarged scale and in section taken on line 7—7 of FIG. 6, illustrating further structural details of the bottom gusset in its unfolded condition.

Reference is now made to the drawings and in particular to FIGS. 1 and 6, respectively, showing the bag 10 hereof in a flat condition preparatory to receiving therein a round-shaped object such as a plate P (FIG. 1), and in a condition bounding a three-dimensional internal volume serving as a protective container for the plate P shown disposed within the bag (FIG. 6). As is best understood from the comparison of FIGS. 1 and 6, the bag 10 although having the substantially horizontally oriented bottom edge 10a when in the flat, as depicted in FIG. 1, has a round or curved bottom edge 10b when actually serving as a container for the plate P, as depicted in FIG. 6. As a consequence, the bottom edge 10b of the filled bag closely conforms in shape to the shape of the lower curved edge LCE of the plate P and thus provides a highly desirable neat appearance when serving as a commercial package for round-shaped objects, as exemplified by the plate P, the bag 10 hereof having eliminated therefrom, for all practical purposes, unsightly "dog ears" in the opposite bottom edges thereof.

In a preferred embodiment, as illustrated herein, the bag 10 includes the usual pair of front and rear walls 12 and 14, respectively, sealed to each other along opposite marginal edges 16 and 18. The upper edges 12a, 14a of these bag walls extend the entire width of the bag and bound an upper opening 20 into the internal volume of the bag, these edges being of a sufficient extent to accommodate the diameter of the plate P. To provide a bag closure structure at the upper edges 12a, 14a, these edges are folded inwardly into hems 12b, 14b and have draw strings 22, 24 operatively arranged therein and extending laterally through openings in the sides of the bags, the draw strings being attached to each other along these laterally extending length portions, as at 26. As generally understood, by pulling on one or both of the ends of the draw strings 22, 24, the upper bag edges 12a, 14a are gathered together to not only close the upper bag opening 20 but also to conform the upper end of the bag to the curved shape of the plate upper curved edge UCE. It will of course be understood that in lieu of draw strings 22, 24, use can be made of ties appropriately arranged on the sides of the upper bag edges 12a, 14a and effective, when tied to each other, to also close the upper bag opening 20 and also to gather the material at this end of the bag into close conformity about the plate upper curved edge UCE.

To similarly provide a shape in the bag 10 which conforms in shape to the curved shape of the other remote edge LCE of the plate P, and thus provide a package which neatly accommodates the plate P, the bag 10 is provided with a tapered bottom bag construction as exemplified by the construction now to be described in detail. This tapered bottom bag construction includes a bag section 10c of a reduced width provided by opposite inwardly oriented side weld length segments 16a and 18a. In the illustrated embodiment, an acute angle A of approximately 20 degrees is subtended by each length segment 16a, 18a and an imaginary extension of the upper vertical portions of the side welds 16, 18.

Cooperating with the reduced bag sections 10c is a bottom gusset construction 28 having the usual inward fold and also the novel feature, in accordance with the present invention, of inwardly oriented opposite side edges 28a, 28b. Like the side weld length segments 16a, 18a, each gusset side edge 28a, 28b and an imaginary extension of the length segment 16a, 18a also subtent an acute angle B of approximately 20 degrees. As a consequence, the bottom portion of the bag 10 which is coextensive with the bottom gusset construction 28 is similarly reduced in width, as is the adjacent bag section 10c relative to the upper bag section. Thus there is a progressive and uniform reduction in width in the bottom of the bag 10 which essentially results from the herein described inwardly oriented side weld length portions 16a, 18a and 28a, 28b, it being understood, in this connection, that acute angles similar to the angles A and B, but of a different extent than 20 degrees, can also be used and provide the useful tapered construction which is contemplated by the present invention.

Figure 8:
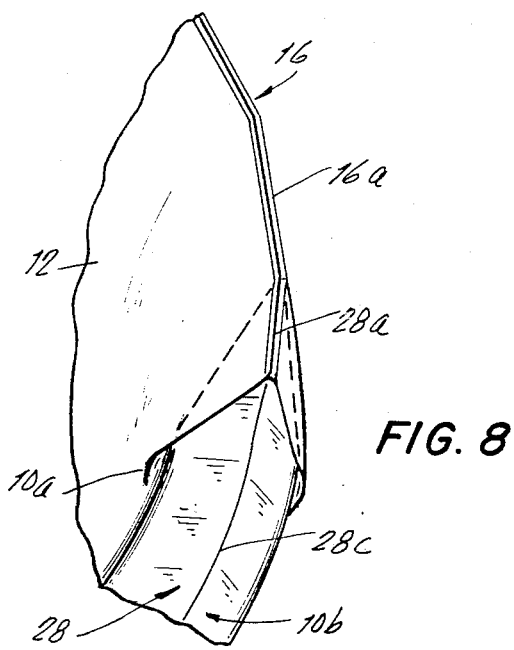
FIG. 8 is a partial perspective view similar to FIG. 5, but again illustrating the bottom gusset in its unfolded condition.

As already noted, one of the significant contributions of the present invention is the appreciation that a bottom gusset construction, as exemplified by the gusset 28, although providing the bag 10 with a horizontally oriented bottom edge 10a in the flat is effective, upon being unfolded, of projecting itself slightly beyond the bottom edge 10a and, specifically, of achieving this projected condition slightly more in the middle than in the side sections thereof. That is, in its unfolded condition, and as best illustrated in FIG. 6, the bottom gusset 28 presents a slightly curved bottom edge 10b extending beyond the original bag bottom edge 10a (traces of which can be detected in FIG. 6 on opposite sides of the curved edge 10b and are identified therein with the reference designation 10a). As is best further noted in FIGS. 7 and 8 in conjunction with FIG. 6, in the unfolding of the gusset the extent of the projection of the fold line 28c is necessarily less restricted in the center of the gusset than in the opposite side portions adjacent the intersections C of the fold line 28c with the side welds 16, 18. Thus, as perhaps is best appreciated from the perspective view of FIG. 8, a natural rounded configuration or shape develops in the unfolded gusset 28, which is favorably accentuated by the inwardly oriented side edges 28a, 28b. This, in turn, cooperates with the inwardly oriented side weld length segments 16a, 18a to thereby provide a substantially round bottom for the bag 10. That is, extending from left to right about the bottom of the bag there is a curved peripheral edge made up of the length segments 18a, 28b, 10b, 28a and 16a which closely conforms in shape to the curved bottom edge LCE of the plate P. Heretofore, to achieve a neat appearing closely conforming fit of the bag about a round-shaped object it was believed necessary to provide the bottom edge of the bag with an actual curved peripheral edge in the flat, a structural feature which is costly and difficult to achieve with mass production bag-making apparatus.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A plastic bag for a round-shaped object comprising a pair of front and rear walls sealed together along opposite marginal edges to define an internal volume therebetween, said front and rear walls having upper edges thereon bounding an opening into said internal volume of a predetermined width sufficient to accommodate said round-shaped object therethrough, and a tapered construction in the bottom of said bag including a section of reduced width in said front and rear walls defined by inwardly orineted length segments in said opposite marginal edges subtending an acute angle between an imaginary extension of the upper marginal edges of said bag and said length segments and a gusset formed in the bottom of said bag having inwardly oriented opposite sealed side edges subtending an acute angle between an imaginary extension of said length segments and said gusset side edges, whereby upon unfolding said gusset said tapered construction fits in close conformity about the adjacent curved edge of said round-shaped object.

2. A plastic bag for a round-shaped object comprising a pair of front and rear walls sealed together along opposite marginal edges to define an internal volume therebetween, said front and rear walls having upper edges thereon bounding an opening into said internal volume of a predetermined width sufficient to accommodate said round-shaped object therethrough, a hem construction formed along each said upper edge and a draw string operatively arranged within each said hem effective during closing of said bag to gather said upper edges together in close conformity about the adjacent curved dege of said round-shaped object, and a tapered construction in the bottom of said bag including a section of reduced width in said front and rear walls defined by inwardly oriented length segments in said sealed opposite marginal edges subtending an acute angle between an imaginary extension of the upper marginal edges of said bag and said length segments and a gusset formed in the bottom of said bag having inwardly oriented opposite side edges subtending an acute angle between an imaginary extension of said length segments and said gusset side edges, whereby upon unfolding said gusset said tapered construction fits in close conformity about the adjacent other curved edge of said round-shaped object.

References Cited

UNITED STATES PATENTS

| 2,880,925 | 4/1959 | Klasing et al. | 229—53 |
| 3,114,497 | 12/1963 | Kugler | 229—63 |
| 3,136,475 | 6/1964 | Geimer | 229—57 |
| 3,003,681 | 10/1961 | Orsini | 229—57 |

DAVID M. BOCKENEK, *Primary Examiner.*